No. 713,102. Patented Nov. 11, 1902.
C. W. HUNT.
DRIVE CHAIN.
(Application filed May 1, 1902.)
(No Model.)

UNITED STATES PATENT OFFICE.

CHARLES W. HUNT, OF WEST NEW BRIGHTON, NEW YORK.

DRIVE-CHAIN.

SPECIFICATION forming part of Letters Patent No. 713,102, dated November 11, 1902.

Application filed May 1, 1902. Serial No. 105,466. (No model.)

*To all whom it may concern:*

Be it known that I, CHARLES WALLACE HUNT, a citizen of the United States, residing in West New Brighton, borough of Richmond, city of New York, State of New York, have invented certain new and useful Improvements in Drive-Chains, of which the following is a specification, reference being had to the accompanying drawings, forming a part hereof.

This invention relates to drive-chains which are made up of a series of sets or groups of links, the links of one set or group being pivotally connected with the links of the next set or group by a pivot-pin which passes through the overlapping ends of the links of the two sets or groups.

One object of the invention is to increase the flexibility of such chains with reference to the longitudinal axis, so that they may be successfully used to connect wheels the axes of which are not parallel. Incidentally to the carrying out of this object of the invention the links are also strengthened where strength is most needed. As a further result, also incidental to the primary object of the invention, the lubrication of such chains is facilitated.

A further main object is to protect such chains as much as possible from becoming clogged with dirt, and particularly to prevent the wearing of grooves in the flanges of the chain-wheels by the protruding ends of the pivot-pins.

The invention will be more fully described hereinafter with reference to the accompanying drawings, in which the invention is illustrated, and in which—

Figure 3:
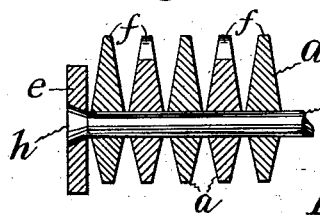
Figure 2:
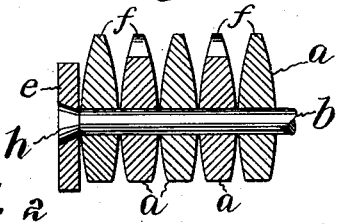
Figure 1:
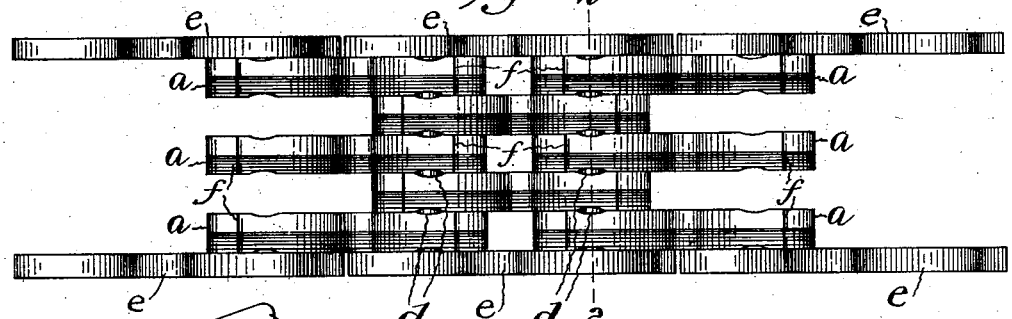
Figure 4:
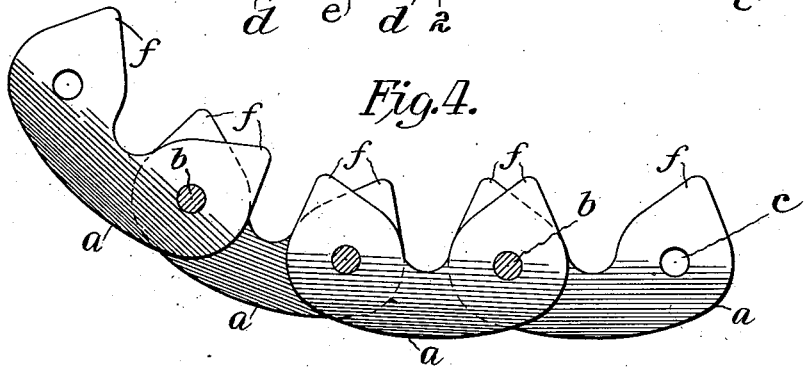
Figure 5:
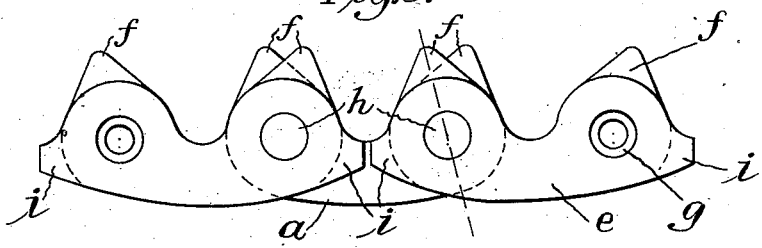
Figure 6:
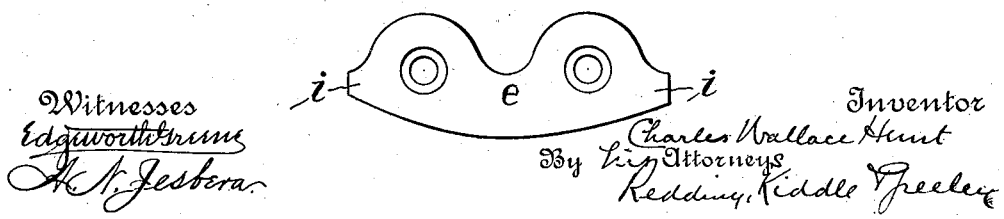

Figure 1 is a plan view of a chain constructed in accordance with the invention. Fig. 2 is a sectional view of such a chain as that shown in Fig. 1 on the plane indicated by the line 2 2 of Fig. 1. Fig. 3 is a view similar to Fig. 2, but showing links of a slightly different form in cross-section. Fig. 4 is a view in side elevation of the chain shown in Fig. 1, the washers being removed. Fig. 5 is a similar view of a chain with the washers in position. Fig. 6 is a detail view, in side elevation, of one of the double washers shown in Figs. 1 and 5.

The invention is illustrated in the drawings as embodied in a chain in which the links $a$ of successive sets or groups alternate and in which the links are formed on one side with drive-teeth, the links bearing directly upon the pivot-pin $b$, by which they are connected. It will be obvious that the invention is not restricted in this application to chains of the particular construction and arrangement represented in the drawings, such construction and arrangement being shown for convenience in explanation of the invention. In accordance with the invention each link has its greatest thickness approximately in a plane which includes the axes of both of its pivot-holes $c$, so that when such links are assembled they shall bear laterally against each other only in the plane of their greatest thickness. As represented in Fig. 2, the links may have rounded sides, or, as represented in Fig. 3, the links may be prismatic in cross-section, with flat faces. The particular form of the links in cross-section, as will be understood, is not material, it being essential merely that the links shall bear against each other substantially in a longitudinal line and that the plane of such bearing shall substantially coincide with the plane of the pivotal axis of the links. Whatever may be the particular form of the links it will be seen that the bearing of the links against each other, as described, instead of a bearing of flat faces one against another, permits the links to incline one way or the other upon the pivot-pin to an extent which is limited by the bearing of the links upon the pins. It is obvious that with an ordinary free fit of the links on the pins a considerable torsion of the chain about its longitudinal axis will be possible in a substantial length, so that it will easily be possible to give such a chain a quarter-turn, more or less, if desired. It will also be apparent that the thickening of the links as described gives the links the greatest strength in the plane where the greatest strength is required. Further, since the links bear against each other practically in a line, while the pivot-pins must have substantial diameter, and the holes $c$ therefor must extend on both sides of the line of bearing the pivot-pins will be exposed between the links, as at $d$, thus facilitating the lubrication of the links on the pivot-pins, whereas if the links bore against one another with parallel sides the lubrication of the bearings of the links on the pivot-pins would be imperfectly accomplished or would require the provision of special means to permit access of the lubricant.

Chains of the general character of that shown and described herein are commonly used with flanged wheels, and as such chains are generally constructed the pivot-pins, which protrude slightly beyond the surface of the outside links, eventually wear grooves in the inner faces of the wheel-flanges. Various expedients for obviating this difficulty have been suggested heretofore, but they involve a counter sinking of the holes in the outside links, and therefore a weakening of such links or other objections. In chains having links which bear against each other in a line, as hereinbefore described, the counter-sinking of the hole in the outside link to avoid the projection of the head of the pin would be particularly objectionable. For the purpose, therefore, of preventing the projection of the pivot-pins so as to groove the wheel-flanges and for the further purpose of protecting the chain a double washer $e$ is provided, which washer may have substantially the same shape as each link, except that it does not require to be provided with the teeth $f$, since its function is to protect the pins and provide a smooth surface on the side of the chain and is long enough to receive the ends of two adjacent pivot-pins. Each hole in the washer is countersunk, as at $g$, to receive the expanded end $h$ of the pivot-pin $b$, the liability to the formation of a wire-edge at the inner surface of the washer being unobjectionable, since, as before stated, the washer does not sustain any of the strain. Preferably the ends of the washers are extended, as at $i$, so that the ends of adjacent washers shall nearly meet, and thereby substantially cover the whole of the chain and leave no space that might make uneven wear on the flange of the wheel.

It will be understood that the invention is not to be limited to the particular form of the parts shown in the drawings and described herein, since it is obvious that the form of parts may be varied considerably without departing from the spirit of the invention.

I claim as my invention—

1. A chain composed of links and pivot-pins uniting successive sets or groups of links, each link having its greatest thickness substantially in the plane including the axes of the pivot-pins, whereby said links bear against one another substantially in a line, substantially as described.

2. A chain composed of links having teeth formed on one side thereof and pivot-pins uniting successive sets or groups of links, each link having its greatest thickness substantially in a plane including the axes of the pivot-pins, whereby the links bear against one another in a line, substantially as described.

3. A drive-chain composed of links and pivot-pins uniting the successive sets or groups of links, each of said links having its greatest thickness substantially in a plane including the axes of the pivot-pins, and washers, each washer having holes countersunk therein to receive the heads of two adjacent pivot-pins, substantially as described.

4. A drive-chain composed of tooth-links, pivot-pins uniting successive sets or groups of links, and washers, each washer having holes therein to receive the heads of two adjacent pivot-pins, substantially as described.

5. A drive-chain composed of links, pivot-pins uniting successive sets or groups of links, and washers, each washer having holes to receive the heads of two adjacent pivot-pins and having its ends extended whereby said washers substantially cover the sides of the chain, substantially as described.

This specification signed and witnessed this 29th day of April, A. D. 1902.

CHARLES W. HUNT.

In presence of—
GEO. S. HUMPHREY,
CHAS. E. SIMONSON.